United States Patent
Havens

(10) Patent No.: US 9,434,810 B2
(45) Date of Patent: Sep. 6, 2016

(54) SHAPE MEMORY EPOXY MATERIALS USING AROMATIC ALCOHOL CURE AGENTS

(71) Applicant: Spirit AeroSystems, Inc., Wichita, KS (US)

(72) Inventor: Teresa Havens, Bellbrook, OH (US)

(73) Assignee: Spirit AeroSystems, Inc., Wichita, KS (US)

( * ) Notice: Subject to any disclaimer, the term of this patent is extended or adjusted under 35 U.S.C. 154(b) by 39 days.

(21) Appl. No.: 14/450,995

(22) Filed: Aug. 4, 2014

(65) Prior Publication Data

US 2014/0343247 A1    Nov. 20, 2014

Related U.S. Application Data

(60) Provisional application No. 61/861,829, filed on Aug. 2, 2013.

(51) Int. Cl.
| | |
|---|---|
| *C08G 59/62* | (2006.01) |
| *C08G 59/38* | (2006.01) |
| *C08G 59/68* | (2006.01) |
| *C08G 59/02* | (2006.01) |

(52) U.S. Cl.
CPC .......... *C08G 59/022* (2013.01); *C08G 59/621* (2013.01); *C08G 59/68* (2013.01)

(58) Field of Classification Search
None
See application file for complete search history.

(56) References Cited

U.S. PATENT DOCUMENTS 4,055,541 A * 10/1977 Riew .................. C08F 8/32
427/386

* cited by examiner

*Primary Examiner* — Michael J Feely
(74) *Attorney, Agent, or Firm* — Hovey Williams LLP

(57) ABSTRACT

Embodiments of the present disclosure are directed to a cured epoxy shape memory material by reacting a mixture comprising multifunctional epoxide reagent, triglycidyl ether diluent, catalyst, and at least one aromatic alcohol curing agent of Formula I:

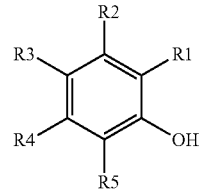

Formula I wherein R1 and R5 are H, alkyl, aryl, or alkoxy, but not —CH$_2$OH and R2, R3 or R4 are H, OH, alkyl, aryl, alkoxy or —Y—OH with the proviso that at least one of R2, R3 or R4 is —Y—OH, wherein Y is an alkylene.

27 Claims, No Drawings

SHAPE MEMORY EPOXY MATERIALS USING AROMATIC ALCOHOL CURE AGENTS

CROSS-REFERENCE TO RELATED APPLICATIONS

This application claims priority to U.S. Provisional Application Ser. No. 61/861,829 filed Aug. 2, 2013, which is incorporated by reference herein in its entirety.

BACKGROUND

The present disclosure is generally related to shape memory epoxy materials, and specifically related to shape memory epoxy materials produced from a mixture comprising aromatic alcohol cure agents.

Shape memory polymers (SMPs) are thermoset materials capable of distortion above their glass transition temperatures (Tg), storing such distortion at temperatures below their Tg as potential mechanical energy in the material, and releasing this energy when heated again to above the Tg, returning to their original "memory" shape.

Because of this flexibility, SMPs have utility in a variety of industrial applications. One such industrial application is the manufacture of composite parts, for example parts used in aircraft manufacture. In these applications, SMPs are used as a rigid cure tool/mandrel on which composite material is applied and then cured into a rigid composite part. Because of its ability to return to its "memory" shape, the SMP tooling is easily separable from the rigid composite part, and is reusable for the fabrication of additional composite parts. Additional details regarding the fabrication of composite parts are provided in U.S. Pat. No. 8,734,703, which is incorporated by reference herein in its entirety.

Because of these beneficial uses, the development of epoxy SMPs having improved strength and temperature stability is desirable.

SUMMARY

According to one embodiment, a method of making an cured epoxy shape memory material comprising producing the cured epoxy shape memory materials by reacting a mixture, wherein the mixture comprises multifunctional epoxide reagent, triglycidyl ether diluent, catalyst, and at least one aromatic alcohol curing agent of Formula I:

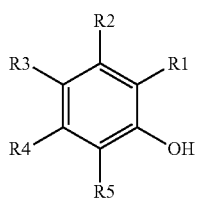

Formula I wherein R1 and R5 are H, alkyl, aryl, or alkoxy, but not —CH$_2$OH and R2, R3 or R4 are H, OH, alkyl, aryl, alkoxy or —Y—OH with the proviso that at least one of R2, R3 or R4 is —Y—OH, wherein Y is an alkylene.

According to additional embodiments, cured epoxy shape memory materials produced from the above mixture, and epoxy shape memory materials used in composite mandrels/tooling are also disclosed herein.

DETAILED DESCRIPTION

Embodiments of the present disclosure are directed to cured epoxy shape memory materials, and methods of making cured epoxy shape memory materials with an aromatic alcohol curing agent (hardener) of Formula I:

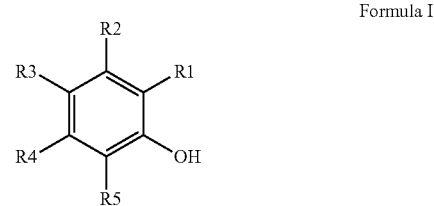

Formula I wherein R1 and R5 are H, alkyl, aryl, or alkoxy, but not —CH$_2$OH and R2, R3 or R4 are H, OH, alkyl, aryl, alkoxy or —Y—OH with the proviso that at least one of R2, R3 or R4 is —Y—OH, wherein Y is an alkylene. In exemplary embodiments described below, at least one of R2, R3 or R4 includes a —CH$_2$OH (hydroxy) substituent.

The cured epoxy shape memory materials is produced by reacting a mixture including the above aromatic alcohol curing agent, a multifunctional epoxide reagent, which may be considered as a first monomer, and triglycidyl ether diluent, which may be considered as a second monomer. The mixture also may include a catalyst; however, it is contemplated that some mixtures could be catalyst free.

Without being limited to theory, the cured epoxy shape memory materials is a versatile composition, because it is suitable at a wide range of glass transition temperatures (Tg). A glass transition temperature (Tg) is defined herein as a threshold temperature at and/or above which that shape memory material begins to transition to a lower modulus state, becoming soft and/or malleable in order to be deformed. For example, the present cured epoxy shape memory materials may have a Tg range of greater than about 0° C., or from about 60° C. or below, or from about 20° C. to about 60° C. Alternatively, the Tg could also be from about 20° C. to about 40° C., or from about 40° C. to about 60° C.

As stated above, the aromatic alcohol of Formula I may encompass various compositions in accordance with the above R1-R5 variables. Without being bound by theory, the present benzene rings with an OH and at least one alkylene-OH group on non-adjacent carbons allows for improved strain capability, improved chain formation, and a lower Tg, while controlling the level of reactivity and cross-linking. Specifically, the present aromatic alcohol curing agents controls the cross-linking during curing to enable the present cured epoxy shape memory materials to achieve lower Tg values of 60° C. and below without becoming thermoplastic. A relatively low crosslink density is required in SMP materials to allow movement of cured epoxy chains, increasing elongation and shape memory properties. However, if too few crosslinkers are present, the material behaves as a thermoplastic, irreversibly deforming at elevated temperatures. Here, the aromatic alcohol curing agent controls the crosslinking to allow for maximum elongation, lower Tg, while preventing the present cured epoxy shape memory materials from becoming thermoplastic i.e., irreversibly deforming.

Due to spacing between OH groups, steric hindrance is reduced which thereby allows for additional cross-linking during curing. If cross-linking during curing is sterically hindered and thereby prevented, the SMP may be less stable when incorporated into industrial applications, such as tooling used in composite manufacture. Specifically even after cure, uncrosslinked regions of the SMP tool may continue to react and crosslink, which is undesirable when composites are being formed on the SMP tool. Additionally as stated above, having an OH and at least one alkyl-OH group on non-adjacent carbons also beneficially facilitates the formation of longer chain lengths. In specific embodiments, the cured epoxy shape memory materials may have an elongation (or deformation) of about 300 to about 600% at a temperature of 120° C.

In further embodiments, the aromatic alcohol of Formula I may include an alkoxy on R1 or R5, for example, a methoxy group. In another embodiment of Formula I, the R3 may be —Y—OH, wherein the Y is an alkylene group. In specific embodiments, the R3 is —CH$_2$OH (hydroxy).

For example and by way of limitation, the structure of Formula I may encompass one or more of:

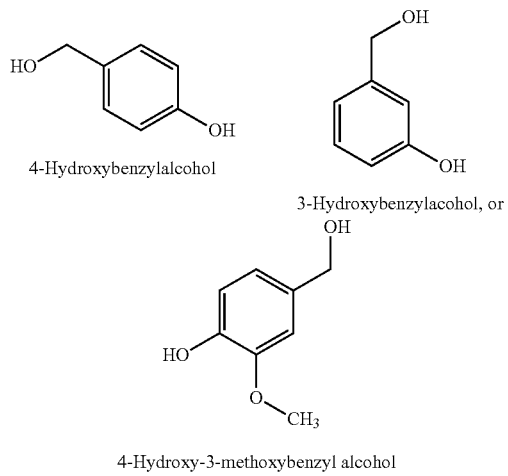

4-Hydroxybenzylalcohol

3-Hydroxybenzylacohol, or

4-Hydroxy-3-methoxybenzyl alcohol

The multifunctional epoxide reagent may encompass various monomers having at least two epoxides. In specific embodiments, the multifunctional epoxide resin is difunctional epoxide resin. For example, the difunctional epoxide may include one or more of diglycidyl ethers of resorcinol, hydroquinone, 4,4'-isopropylidene bisphenol (bisphenol A), bis(4-hydroxyphenyl)-2,2-dichloroethylene (bisphenol C), bis(4-hydroxyphenyl)methane (bisphenol F), 4,4'-sulfonyldiphenol (bisphenol S), 4,4'-(9-fluorenylidene)diphenol, 4,4'-dihydroxydiphenylethylmethane, 3,3'-dihydroxydiphenyldiethylmethane, 3,4'-dihydroxydiphenylmethylpropylmethane, 4,4'-dihydroxydiphenyloxide, 4,4'-dihydroxydiphenylcyanomethane, 4,4'-dihydroxybiphenyl, 4,4'-dihydroxybenzophenone (bisphenol K), 4,4'-dihydroxydiphenyl sulfide, 2,6-dihydroxynaphthalene, 1,3-dihydroxynaphthalene, 1,5-dihydroxynaphthalene, 1,6-dihydroxynaphthalene, 1,7-dihydroxynaphthalene, 2,7-dihydroxynaphthalene, catechol, 1,4-butanediol, 1,4-cyclohexanedimethanol, 1,2-cyclohexanedimethanol, 1,6-hexanediol, neopentyl glycol, and ethylene glycol. In an exemplary embodiment, the multifunctional epoxide is diglycidyl ether of bisphenol A (DGEBA). Various commercial DGEBA products are suitable, for example, DER™ 332 produced by The Dow Chemical Company.

The triglycidyl ether diluent may include various compositions compatible with the multifunctional epoxide resin. For example and not by way of limitation, the triglycidyl ether diluent may include one or more of trimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, glycerol ethoxylate triglycidyl ether, castor oil triglycidyl ether, and propoxylated glycerine triglycidyl ether. In an exemplary embodiment, the triglycidyl ether diluent is propoxylated glycerine triglycidyl ether. Various commercial products are suitable, for example, Erisys™ GE-36 produced by CVC Thermoset Specialties.

While various catalysts are contemplated herein, catalyst embodiments of the present disclosure include aromatic salts. For example and not by way of limitation, the catalyst may include one or more of bis(triphenylphosphoranylidene) ammonium chloride, bis(triphenylphosphoranylidene)ammonium bromide, bis(triphenylphosphoranylidene)ammonium acetate, and combinations thereof. In an exemplary embodiment, the catalyst may be bis-(triphenylphosphoranylidene)ammonium chloride.

Additionally, the mixture, which is cured to achieve the cured epoxy based shape memory material may also include additional curing agent in addition to the alcohol of Formula I. For example, the additional curing agent may be catechol, pyrocatechol, resorcinol or combinations thereof.

The mixture may include various amounts of each component. In one or more embodiments, the mixture may comprise 30-99% by wt of multifunctional epoxide, or 35-75% by wt multifunctional epoxy resin. Moreover, the mixture may include 0.1-20% by wt of triglycidyl ether diluent, or 5-20% by wt triglycidyl either monomer diluent, or 5-15% by wt triglycidyl either monomer diluent. Moreover, the mixture may include 1-30% by wt of the alcohol curing agent of Formula I, or in some embodiment, between 10-25% by wt of an alcohol curing agent of Formula I. Additionally, the mixture may comprises 0.1-10% by wt catalyst, or 0.1-01% by wt. catalyst.

As stated above, lower Tg values, for example, a Tg of 60° C. and below are desirable for the present cured epoxy based shape memory materials. In some cases, raising the amount of triglycidyl ether diluent above 20% by wt may achieve this lower Tg; however, issues of stickiness may arise when used in temperatures associated with SMP tooling of greater than 150° C., or for example, about 177° C. Without being bound by theory, it was surprisingly discovered that the combination of multifunctional epoxide resin, 20% by wt or less triglycidyl ether diluent, and the alcohol curing agent of formula I synergistically produces an SMP of 60° C. and below which is also substantially non-sticky at these higher tooling temperatures.

EXAMPLES

Provided below is the method of making one of the many contemplated cured epoxy shape memory materials encompassed by the present disclosure. To produce the cured epoxy shape memory material, the components are mixed in a vacuum chamber, specifically a vacuum chamber by Advanced Process Technology. Here, the 143.10 g of DER™ 332 (DEGBA) is mixed with 56.4 g of Erisys™ GE-36, 70.5 g of 4-hydroxybenzyl alcohol curing agent, and 30 g of bis-(triphenylphosphoranylidene)ammonium chloride catalyst. Upon mixing, the composition undergoes a cure cycle of 24 hours at 120° C. in the vacuum chamber followed by a ramp-up of the temperature to 177° C. and maintaining at that temperature for 14 hours.

In addition to the above compositions, it is possible to further tune the mechanical properties such as toughness and $T_g$ of the epoxy SMP using thermoplastic polymers. Thermoplastics are dissolved in epoxy resin systems to increase toughness, enhance self-healing properties, and modify other material properties. By incorporation the following commercial thermoplastics in epoxy SMP resin the mechanical and chemical properties of the final SMP can be tailored to specific design and environmental requirements: polystyrene, polysulfone, and polymethyl methacrylate. The following thermoplastics, and their cured polymer forms, also have potential use in epoxy SMP: polyacrylonitrile, polybutylacrylate, polymethylmethacrylate, polybutadiene, polyoxymethylene (acetal), High impact polystyrene, polyamide, polybutylene terephthalate, polycarbonate, polyethylene, polyethylene terephthalate, polyetheretherketone, polyetherimide, polyethersulfone, polyphthalamide, polyphenylene ether, polyphenylene sulfide, polystyrene, polysulfone, polyurethane, polyester, and poly(styrene-acrylonitrile).

It is further noted that terms like "preferably," "generally," "commonly," and "typically" are not utilized herein to limit the scope or to imply that certain features are critical, essential, or even important to the structure or function of the claimed embodiments. Rather, these terms are merely intended to highlight alternative or additional features that may or may not be utilized in a particular embodiment of the present disclosure.

The above detailed description of embodiments of the disclosure is intended to describe aspects of the disclosure in sufficient detail to enable those skilled in the art to practice the disclosed embodiments. Other embodiments can be utilized and changes can be made without departing from the scope.

In this description, references to "one embodiment," "an embodiment," or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, step, etc. described in one embodiment may also be included in other embodiments, but is not necessarily included. Thus, the present technology can include a variety of combinations and/or integrations of the embodiments described herein.

What is claimed is:

1. A method of making a cured epoxy shape memory material comprising: producing the cured epoxy shape memory material by reacting a mixture comprising: multifunctional epoxide reagent; a triglycidyl ether diluent different from said multifunctional epoxide reagent; and at least one aromatic alcohol curing agent of Formula I, in the presence of a catalyst:

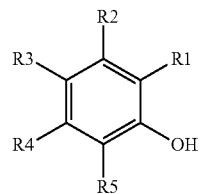

Formula I wherein:
each of R1 and R5 is independently H, alkyl, aryl, or alkoxy, but not —CH$_2$OH; and
each of R2, R3 and R4 is independently H, OH, alkyl, aryl, alkoxy or —Y—OH with the proviso that at least one of R2, R3 and R4 is —Y—OH, wherein Y is an alkylene.

2. The method of claim 1 wherein Y is —CH$_2$.
3. The method of claim 1 wherein at least one of R1 and R5 is an alkoxy.
4. The method of claim 1 wherein R3 is —Y—OH.
5. The method of claim 1 wherein Formula I is chosen from:

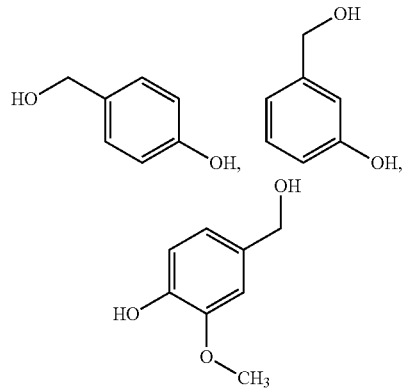

or combinations thereof.

6. The method of claim 1 wherein the cured epoxy shape memory material has a glass transition temperature (Tg) of 60° C. or below.
7. The method of claim 1 wherein the mixture comprises 30-99% by wt of multifunctional epoxide, 0.1-20% by wt of triglycidyl ether diluent, 1-30% by wt of the aromatic alcohol curing agent of Formula I, and 0.1-10% by wt. of the catalyst.
8. The method of claim 1 wherein the mixture comprises 10-25% by wt of the aromatic alcohol curing agent of Formula I.
9. The method of claim 1 wherein the catalyst is selected from the group consisting of: bis(triphenylphosphoranylidene)ammonium chloride, bis(triphenylphosphoranylidene)ammonium bromide, bis(triphenylphosphoranylidene)ammonium acetate, and combinations thereof.
10. The method of claim 1 wherein the multifunctional epoxide reagent is at least one diglycidyl ether of a compound selected from the group consisting of resorcinol, hydroquinone, 4,4'-isopropylidene bisphenol (bisphenol A), bis(4-hydroxyphenyl)-2,2-dichloroethylene (bisphenol C), bis(4-hydroxyphenyl)methane (bisphenol F), 4,4'-sulfonyldiphenol (bisphenol S), 4,4'-(9-fluorenylidene)diphenol, 4,4'-dihydroxydiphenylethylmethane, 3,3'-dihydroxydiphenyldiethylmethane, 3,4'-dihydroxydiphenylmethylpropylmethane, 4,4'-dihydroxydiphenyloxide, 4,4'-dihydroxydiphenylcyanomethane, 4,4'-dihydroxybiphenyl, 4,4'-dihydroxybenzophenone (bisphenol K), 4,4'-dihydroxydiphenyl sulfide, 2,6-dihydroxynaphthalene, 1,3-dihydroxynaphthalene, 1,5-dihydroxynaphthalene, 1,6-dihydroxynaphthalene, 1,7-dihydroxynaphthalene, 2,7-dihydroxynaphthalene, catechol, 1,4-butanediol, 1,4-cyclohexanedimethanol, 1,2-cyclohexanedimethanol, 1,6-hexanediol, neopentyl glycol, and ethylene glycol.

11. The method of claim 1 wherein the triglycidyl ether diluent is selected from the group consisting of trimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, p-aminophenol triglycidyl ether, 1,2,6-hexanetriol triglycidyl ether, glycerol triglycidyl ether, diglycerol triglycidyl ether, glycerol ethoxylate triglycidyl ether, castor oil triglycidyl ether, propoxylated glycerine triglycidyl ether, and combinations thereof.

12. The method of claim 1 wherein the mixture further comprises additional curing agent.

13. The method of claim 1, wherein the cured epoxy shape memory material has elongation of about 300 to about 600% at a temperature of 120° C.

14. A cured epoxy shape memory material comprising: a cured mixture of multifunctional epoxide reagent; a triglycidyl ether diluent different from said multifunctional epoxide reagent; and at least one aromatic alcohol curing agent of Formula I:

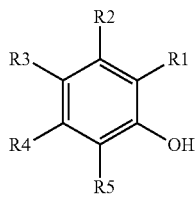

wherein:
each of R1 and R5 is independently H, alkyl, aryl, or alkoxy, but not CH$_2$OH; and
each of R2, R3 and R4 is independently H, OH, alkyl, aryl, alkoxy or —Y—OH with the proviso that at least one of R2, R3 and R4 is —Y—OH, wherein Y is an alkylene.

15. The cured epoxy shape memory material of claim 14 wherein Y is —CH$_2$.

16. The cured epoxy shape memory material of claim 14 wherein the cured epoxy shape memory copolymer material has a glass transition temperature (Tg) of 60° C. or below.

17. The cured epoxy shape memory material of claim 14 wherein at least one of R1 and R5 is an alkoxy.

18. The cured epoxy shape memory material of claim 14 wherein R3 is —CH$_2$OH.

19. The cured epoxy shape memory material of claim 14 wherein Formula I is chosen from:

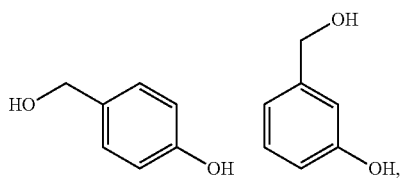

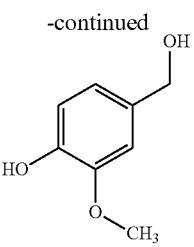

or combinations thereof.

20. The cured epoxy shape memory material of claim 14 wherein the mixture comprises 30-99% by wt of multifunctional epoxide, 0.1-20% by wt of triglycidyl ether diluent, and 1-30% by wt of the aromatic alcohol curing agent of Formula I.

21. The cured epoxy shape memory material of claim 14 wherein the mixture comprises 10-25% by wt of an alcohol curing agent of Formula I.

22. The cured epoxy shape memory material of claim 14 wherein the mixture is cured in the presence of a catalyst selected from the group consisting of bis(triphenylphosphoranylidene) ammonium chloride, bis(triphenylphosphoranylidene)ammonium bromide, bis(triphenylphosphoranylidene)ammonium acetate, and combinations thereof.

23. The cured epoxy shape memory material of claim 14 wherein the multifunctional epoxide reagent is at least one diglycidyl ether of a compound selected from the group consisting of resorcinol, hydroquinone, 4,4'-isopropylidene bisphenol (bisphenol A), bis(4-hydroxyphenyl)-2,2-dichloroethylene (bisphenol C), bis(4-hydroxyphenyl)methane (bisphenol F), 4,4'-sulfonyldiphenol (bisphenol S), 4,4'-(9-fluorenylidene)diphenol, 4,4'-dihydroxydiphenylethylmethane, 3,3'-dihydroxydiphenyldiethylmethane, 3,4'-dihydroxydiphenylmethylpropylmethane, 4,4'-dihydroxydiphenyloxide, 4,4'-dihydroxydiphenylcyanomethane, 4,4'-dihydroxybiphenyl, 4,4'-dihydroxybenzophenone (bisphenol K), 4,4'-dihydroxydiphenyl sulfide, 2,6-dihydroxynaphthalene, 1,3-dihydroxynaphthalene, 1,5-dihydroxynaphthalene, 1,6-dihydroxynaphthalene, 1,7-dihydroxynaphthalene, 2,7-dihydroxynaphthalene, catechol, 1,4-butanediol, 1,4-cyclohexanedimethanol, 1,2-cyclohexanedimethanol, 1,6-hexanediol, neopentyl glycol, and ethylene glycol.

24. The cured epoxy shape memory material of claim 14 wherein the triglycidyl ether diluent is selected from the group consisting of trimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, p-aminophenol triglycidyl ether, 1,2,6-hexanetriol triglycidyl ether, glycerol triglycidyl ether, diglycerol triglycidyl ether, glycerol ethoxylate triglycidyl ether, castor oil triglycidyl ether, propoxylated glycerine triglycidyl ether, and combinations thereof.

25. The cured epoxy shape memory material of claim 14 wherein the mixture further comprises additional curing agent.

26. A composite mandrel comprising the cured epoxy shape memory material of claim 14.

27. The cured epoxy shape memory material of claim 14, wherein the epoxy shape memory material has elongation of about 300 to about 600% at a temperature of 120° C.

* * * * *